(12) United States Patent
Bayer et al.

(10) Patent No.: US 8,799,592 B2
(45) Date of Patent: Aug. 5, 2014

(54) DIRECT MEMORY ACCESS-LIKE DATA TRANSFER BETWEEN GUEST OPERATING SYSTEMS

(75) Inventors: Gerd Bayer, Boeblingen (DE); Marco Kraemer, Boeblingen (DE); Hoang-Nam Nguyen, Boeblingen (DE); Christoph Raisch, Boeblingen (DE); Stefan Usenbinz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 13/442,904

(22) Filed: Apr. 10, 2012

(65) Prior Publication Data

US 2012/0271981 A1   Oct. 25, 2012

(30) Foreign Application Priority Data

Apr. 20, 2011   (EP) .................................... 11163247

(51) Int. Cl.
| | |
|---|---|
| G06F 12/00 | (2006.01) |
| G06F 3/06 | (2006.01) |
| G06F 12/08 | (2006.01) |
| G06F 13/12 | (2006.01) |

(52) U.S. Cl.
CPC .......... *G06F 3/0664* (2013.01); *G06F 12/0835* (2013.01); *G06F 13/122* (2013.01)
USPC ............................... 711/154; 711/6; 711/203

(58) Field of Classification Search
CPC .. G06F 3/0664; G06F 12/0835; G06F 13/122
USPC ............................................. 711/6, 154, 203
See application file for complete search history.

(56) References Cited

U.S. PATENT DOCUMENTS

| | | | |
|---|---|---|---|
| 7,571,440 B2 | 8/2009 | Vessey et al. | |
| 2007/0288921 A1 | 12/2007 | King et al. | |
| 2009/0150528 A1* | 6/2009 | Tanabe et al. | 709/221 |
| 2012/0167082 A1* | 6/2012 | Kumar et al. | 718/1 |

FOREIGN PATENT DOCUMENTS

| | | |
|---|---|---|
| WO | WO 02/41156 A2 | 5/2002 |
| WO | WO 2004/061684 A2 | 7/2004 |
| WO | WO 2007/123541 A1 | 11/2007 |

OTHER PUBLICATIONS

Intel, "21555 Non-Transparent PCI-to-PCI Bridge Performance Optimization", Intel Corporation, Application Note (May 2001).
Ben-Yehuda et al., "Utilizing IOMMUs for Virtualization in Linux and Xen", Proceedings of the Linux Symposium, vol. One, pp. 71-85 (Jul. 19-22, 2006).

\* cited by examiner

*Primary Examiner* — Reba I Elmore
(74) *Attorney, Agent, or Firm* — William A. Kinnaman, Esq.; Kevin P. Radigan, Esq.; Heslin Rothenberg Farley & Mesiti P.C.

(57) ABSTRACT

A computer system with a memory containing a first guest operating system, including a first portion of the memory and a second guest operating system, including a second portion of the memory. The memory further contains an address exchange module for exchanging memory address handles, a data mover for moving data between the first and second portions of the memory, and an emulated input output memory management unit for controlling the data mover. Instructions in the memory cause the processor to: register accessible memory with the emulated input output memory management unit, write address handles to the address exchange module, read the address handles from the address exchange module, and move the data into the second portion of the memory.

20 Claims, 4 Drawing Sheets

DIRECT MEMORY ACCESS-LIKE DATA TRANSFER BETWEEN GUEST OPERATING SYSTEMS

PRIOR FOREIGN APPLICATION

This application claims priority from European patent application number EP11163247.7, filed Apr. 20, 2011, which is hereby incorporated herein by reference in its entirety.

BACKGROUND

This invention relates to guest or virtual operating systems, and in particular, to the exchange of data between guest operating systems.

A single server or computer system may host multiple guest operating systems. For some computational tasks, it is beneficial to optimize the rate of data exchange between the guest operating systems. For physical processors and machines this is sometimes achieved using remote direct memory access (RDMA). One processor or operating system is given direct access to the memory belonging to another processor. The first processor is granted permission to read and/or write directly into memory accessible by the second processor. This is extremely fast and efficient, because data does not need to be retrieved, transmitted via a network, and then re-stored in the second memory.

BRIEF SUMMARY

Provided herein, in one aspect, is a computer system which includes a processor and a memory containing machine-executable instructions for execution by the processor. The memory includes: a first guest operating system comprising a first portion of the memory; a second guest operating system comprising a second portion of the memory; an address exchange module for exchanging memory address handles between the first guest operating system and the second guest operating system, wherein the first guest operating system comprises a first address exchange module driver for exchanging the memory address handles using the address exchange module, wherein the second guest operating system comprises a second address exchange module driver for exchanging the memory address handles using the address exchange module; a data mover for moving data between the first portion of the memory and the second portion of the memory; and an emulated input/output memory management unit for controlling the data mover. Execution of the instructions causes the processor to: register accessible memory chosen from the second portion of the memory with the emulated input/output memory management unit; write address handles of the accessible memory to the address exchange module using the second address exchange module driver; read the address handles of the accessible memory from the address exchange module using the first address exchange module driver; determine if a write address of a request to write the data to the second memory portion is within the accessible memory using the emulated input/output memory management unit; and move the data into the second portion of the memory using the data mover if the write address is within the accessible memory.

In another aspect, a computer-readable storage medium is provided containing machine-executable instructions for execution by a processor of a computer system. The computer-readable storage medium includes: a first guest operating system comprising a first portion of the memory; a second guest operating system comprising a second portion of the memory; an address exchange module for exchanging memory address handles between the first guest operating system and the second guest operating system, wherein the first guest operating system comprises a first address exchange module driver for exchanging the memory address handles using the address exchange module, wherein the second guest operating system comprises a second address exchange module driver for exchanging the memory address handles using the address exchange module; a data mover for moving data between the first portion of the memory and the second portion of the memory; and an emulated input/output memory management unit for controlling the data mover. Execution of the instructions causes the processor to: register accessible memory chosen from the second portion of the memory with the emulated input/output memory management unit; write address handles of the accessible memory to the address exchange module using the second address exchange module driver; read address handles of the accessible memory from the address exchange module using the first address exchange module driver; determine if a write address of a request to write the data to the second memory portion is within the accessible memory using the emulated input/output memory management unit; and move the data into the second portion of the memory using the data mover if the write address is within the accessible memory.

In a further aspect, a computer-implemented method of operating a computer system is provided, wherein the computer system includes a processor and a memory containing machine-executable instructions for execution by the processor. The memory includes: a first guest operating system comprising a first portion of the memory; a second guest operating system comprising a second portion of the memory; an address exchange module for exchanging memory address handles between the first guest operating system and the second guest operating system, wherein the first guest operating system comprises a first address exchange module driver for exchanging the memory address handles using the address exchange module, wherein the second guest operating system comprises a second address exchange module driver for exchanging the memory address handles using the address exchange module; a data mover for moving data between the first portion of the memory and the second portion of the memory; and an emulated input/output memory management unit for controlling the data mover. The method includes: registering accessible memory chosen from the second portion of the memory with the emulated input/output memory management unit; writing address handles of the accessible memory to the address exchange module using the second address exchange module driver; reading address handles of the accessible memory from the address exchange module using the first address exchange module driver; determining if a write address of a request to write the data to the second memory portion is within the accessible memory using the emulated input/output memory management unit; and moving the data into the second portion of the memory using the data mover if the write address is within the accessible memory.

BRIEF DESCRIPTION OF THE SEVERAL VIEWS OF THE DRAWINGS

In the following, embodiments of the invention will be described in greater detail by way of example only, making reference to the drawings in which.

DETAILED DESCRIPTION OF EXEMPLARY EMBODIMENTS

This invention provides for a computer system, a computer-readable storage medium, and a method of operating a computer system in the independent claims. Embodiments are given in the depending claims.

Embodiments of the invention may solve the initially-noted and other problems by using a virtual input output memory management unit (IOMMU), which translates IO address handles to physical addresses and rejects access to "unmapped" physical memory. Embodiments of the invention also contain a data mover, which is a software module or engine that copies data from the memory location in one operating system (OS) image into a memory location in another OS image controlled as targeted by a remote address handle.

In some embodiments, a full page move (for example 4 kB) can exploit additional System/z hardware assist to achieve additional speed-up. In an alternate embodiment, the Data Mover can be modified to fetch data from another OS image's memory into the memory of the initiating OS image.

In some embodiments there is an IRQ mechanism. The initiating OS image triggers an IO interrupt to be presented in another OS image by writing into the Virtual PCI RDMA devices' control mechanism.

Some embodiments of the invention, the following features may be provided:
  General purpose PCI based communication mechanism between partitions. A partition may be a memory or buffer allocated to a guest operating system.
  Partitions with RDMA like capabilities
  Partitions protected from "accidental stores"

Some embodiments of the invention may have one or more of the following advantages:
  Synchronous Transport avoids acknowledge latency and simplifies pacing—while being seamlessly integrated into the standard software architecture for PCI devices
  Receiving partition controls allowed range for stores
  Sending partition can structure transferred data in the buffer—in agreement with the consumer on the receiving side.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. References to a computer-readable storage medium should be interpreted as possibly being multiple computer-readable storage mediums. Various executable components of a program or programs may be stored in different locations. The computer-readable storage medium may for instance be multiple computer-readable storage medium within the same computer system. The computer-readable storage medium may also be computer-readable storage medium distributed amongst multiple computer systems or computing devices.

'Computer memory' or 'memory' is an example of a computer-readable storage medium. Computer memory is any memory which is accessible to a processor. Examples of computer memory include, but are not limited to: RAM memory, registers, and register files. In some instances computer memory may also include: a hard disk drive, a floppy drive, and a solid state hard drive. For instance, part of a memory may in fact be swap space on a hard drive. References to 'computer memory' or 'memory' should be interpreted as possibly being multiple memories. The memory may for instance be multiple memories within the same computer system. the memory may also be multiple memories distributed amongst multiple computer systems or computing devices.

'Computer storage' or 'storage' is an example of a computer-readable storage medium. Computer storage is any non-volatile computer-readable storage medium. Examples of computer storage include, but are not limited to the following: In some embodiments computer storage may also be computer memory or vice versa. References to 'computer storage' or 'storage' should be interpreted as possibly being multiple storage. The storage may for instance be multiple storage devices within the same computer system or computing device. The storage may also be multiple storages distributed amongst multiple computer systems or computing devices.

A 'processor' as used herein encompasses an electronic component which is able to execute a program or machine executable instruction. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. Many programs have their instructions performed by multiple processors that may be within the same computing device or which may even be distributed across multiple computing devices.

A 'database' as used herein encompasses a data file or repository which contains data that may be accessed by a processor. Examples of databases are, but are not limited to: a data file, a relational database, a file system folder containing data files, and a spreadsheet file.

A 'guest operating system' as used herein encompasses a virtualization, emulation, or simulation of a computer system. A guest operating system may also be referred to as a virtual machine or virtual computer.

In one aspect the invention provides for a computer system. The computer system comprises a processor and a memory.

The memory contains machine executable instructions for execution by the processor. The memory contains a first guest operating system comprising a first portion of the memory. The memory further contains a second guest operating system comprising a second portion of the memory. The term 'portion of the memory' may be alternatively referred to as a partition: the memory may have first and second partitions. As understood herein a processor may also include multiple processors which may also comprise multiple computing cores. References to a memory may also refer to multiple physical memory storage devices. A memory may also be representative of different types of storage. For instance the first portion of the memory may comprise physical RAM and also memory space on other storage devices such as a hard drive. The same is true for the second portion of the memory. Within the memory the first and second guest operating systems have memory which is reserved or set aside for use by those guest operating systems and also memory which is used in the process of emulating the guest operating systems.

Memory further contains an address exchange module for exchanging memory address handles between the first guest operating system and the second guest operating system. In some embodiments the address exchange module is an executable program or code. In other embodiments it is a buffer which the first and second guest operating systems may use to exchange data. The first guest operating system comprises a first address exchange module driver for exchanging the memory address handles using the address exchange module. The second guest operating system comprises a second address exchange module driver for exchanging the memory address handles using the address exchange module.

The memory further contains a data mover for moving data between the first portion of the memory and the second portion of the memory. The data mover may for instance be a computer program module or executable code which when executed causes the processor to move the data from the first portion of the memory to the second portion of the memory. In some instances the data mover simply copies the data from the first portion to the second portion. In other instances the data is moved by writing the data in the second portion of the memory and deleting it from the first portion of the memory. The memory further contains an emulated input output memory management unit for controlling the data mover. The virtual input output memory management unit may for instance emulate a memory management unit that connects a direct memory access capable IO BUS to the main memory of a computer system. The use of an emulated input output memory management unit enables the first and second guest operating systems to achieve a data exchange rate which rivals that of physical direct memory access techniques.

Execution of the instructions causes the processor to register accessible memory chosen from the second portion of the memory with the emulated input output memory management unit. The accessible memory is a portion of the second portion of the memory which the second guest operating system is allowing the first guest operating system to have write, read and/or read write permissions to. Execution of the instructions further cause the processor to write address handles of the accessible memory to the address exchange module using the second address exchange module driver. The address handles are handles or addresses which are used to reference the location of the accessible memory.

The address handles may for instance be an alias which is used to identify the physical memory. Execution of the instructions further cause the processor to read address handles of the accessible memory from the address exchange module using the first address exchange module driver. Essentially these instructions cause the first guest operating system to read the address handles of the accessible memory. Thus far the instructions have caused the processor to set aside a portion of the second portion of the memory which is deemed to be accessible by the first guest operating system. The second guest operating system has then passed the address handles of the accessible memory to the first guest operating system using the address exchange module.

Execution of the instructions further cause the processor to determine if a write address of a request to write the data to the second memory portion is within the accessible memory using the emulated input output memory management unit. The instructions had previously caused the second guest operating system to register the accessible memory with the emulated input output memory management unit. The first guest operating system generates the request to write the data to the second memory portion. The emulated input output memory management unit then checks the request to see if the write address references memory which is the accessible memory. Execution instructions further cause the processor to move the data into the second portion of the memory using the data mover if the write address is within the accessible memory. In some embodiments if the write address is not within the accessible memory then the request to write the data to the second memory portion will be rejected.

This embodiment of the invention may be advantageous because it enables the first guest operating system to write data to memory allocated to the second guest operating system in an extremely rapid manner. It allows the first guest operating system and the second guest operating system to exchange data at a rate equivalent to a direct memory access transfer between different machines or processors. This may enable two or more guest operating systems to exchange data more rapidly. This may lead to more efficient parallel computing. For instance, in some computer systems there may be model processors or cores. Each of these various guest operating systems may use different combinations of processors and memory. However embodiments of the invention may enable these guest operating systems to perform coordinated computational tasks with greater efficiency and speed.

In another embodiment the data mover asynchronously moves the data between the first memory portion of the memory and the second portion of the memory. The use of asynchronous data transfer is advantageous because it enables extremely rapid data transfer between the first guest operating system and the second guest operating system.

It should be noted that the roles of the first guest operating system and the second guest operating system may be reversed. That is to say that the same mechanisms and structures may be used by the second guest operating system to transfer data from the second portion of the memory to the first portion of the memory.

In another embodiment execution of the instructions further causes the processor to signal data arrival to the second guest operating system after the data is written into the second memory portion. This embodiment is advantageous because essentially the first guest operating system was writing data directly into memory allocated for the second guest operating system. By signaling that data has been written into the second memory portion the second guest operating system may then check to see what data has been written and to use this data in a computation.

In another embodiment the computer system further comprises an Interrupt ReQuest (IRQ) mechanism. Execution of the instructions further causes the processor to signal the data arrival using the IRQ mechanism. This embodiment is advantageous because an interrupt request may have an extremely high priority and in some embodiments may be used to signal the second guest operating system that data has been written into memory by the first guest operating system.

In another embodiment the address exchange module is an emulated PCI non-transparent bridge. This may be advantageous because PCI non-transparent bridges may be used to exchange data efficiently between physical computer systems. The guest operating systems can use PCI card drivers built for physical computer systems with the emulated PCI non-transparent bridge. This enables rapid transfer of data well using standard software modules.

In another embodiment the first address exchange module driver is a first virtual PCI card driver. The second address exchange module driver is a second virtual PCI card driver. The second guest operating system comprises a PCI stack. The processor uses the PCI stack to register accessible memory chosen from the second portion of the memory with the emulated input output memory management unit. The PCI stack is a layer which enumerates the PCI cards that are accessible to the guest operating system and provides the basic mechanisms which the guest operating system may use for communicating with the card driver. The first and second virtual PCI card drivers are used by the first and second guest operating systems to interface and exchange data with the emulated PCI non-transparent bridge.

In another embodiment the address exchange module is an emulated PCI transparent bridge.

In another embodiment the address exchange module is a physical network connection.

In another embodiment the address exchange module is a virtual network connection.

In another embodiment the address exchange module is a database.

In another embodiment the address exchange module is a file.

In another embodiment the emulated input output memory management unit is adapted for translating the address handles into physical memory addresses. Execution of the instructions further causes the processor to translate the address handles into the physical address handles using the emulated input output memory management unit. The data mover uses the physical memory addresses to write the data in the second memory. This embodiment is advantageous because the data mover is able to write the data into the second portion of the memory directly using the physical memory addresses.

In another embodiment the first memory portion is a first buffer of the first guest operating system. The second portion of the memory is a second buffer of the second guest operating system.

In another embodiment the accessible memory is a section of the second portion of the memory for which the second guest operating system grants writing and/or reading permission to the first guest operating system. This embodiment is advantageous because the first guest operating system is granted direct read and/or write permission to the accessible memory.

In another embodiment execution of the instructions further cause the processor to reject writing and/or reading the data in the second memory portion using the data mover if the write address is outside of the accessible memory.

This embodiment is advantageous because if the request for writing to the second portion of the memory using an address outside of the accessible memory not desirable to give the guest operating system these permissions.

In another aspect, the invention provides for a computer-readable storage medium containing machine executable instructions for execution by a processor of a computer system. The computer-readable storage medium contains a first guest operating system comprising a first portion of the memory. The computer-readable storage medium further contains a second guest operating system comprising a second portion of the memory. The computer-readable storage medium further contains an address exchange module for exchanging memory address handles between the first guest operating system and the second guest operating system. The first guest operating system comprises a first address exchange module driver for exchanging the memory address handles using the address exchange module. The second guest operating system comprises a second address exchange module driver for exchanging the memory address handles using the address exchange module. The computer-readable storage medium further contains a data mover for moving data between the first memory portion of the memory and the second portion of the memory. The computer-readable storage medium further contains an emulated input output memory management unit for controlling the data mover.

Execution of the instructions further causes the processor to register accessible memory chosen from the second portion of the memory with the emulated input output memory management unit. Execution of the instructions further cause the processor to write address handles of the accessible memory to the address exchange module using the second address exchange module driver. Execution of the instructions further cause the processor to read address handles of the accessible memory from the address exchange module using the first address exchange module driver.

Execution of the instructions further cause the processor to determine if a write address of a request to write the data to the second memory portion is within the accessible memory using the emulated input output memory management unit. Execution of the instructions further cause the processor to move the data into the second memory portion using the data mover if the write address is within the accessible memory. Advantages of this embodiment have been previously discussed.

In another embodiment the data mover asynchronously moves the data between the first portion of the memory and the second portion of the memory. The advantages of this embodiment have been previously discussed.

In another embodiment execution of the instructions further causes the processor to signal data arrival to the second guest operating system after the data is written into the second memory portion. Advantages of this embodiment have also been previously discussed.

In another aspect the invention provides for a method of operating a computer system likewise it also provides for a computer-implemented method of operating a computer system. The computer system comprises a processor the computer system further comprises a memory containing machine executable instructions for execution by the processor. The memory contains a first guest operating system comprising a first portion of the memory. The memory further contains a second guest operating system comprising a second portion of the memory. The memory further contains an address exchange module for exchanging memory address handles between the first guest operating system and the second guest operating system. The first guest operating system comprises a first address exchange module driver for exchanging the memory address handles using the address exchange module. The second guest operating system comprises a second address exchange module driver for exchanging the memory address handles using the address exchange module. The memory further contains a data mover for moving data between the first portion of the memory and the second portion of the memory. The memory further contains an emulated input output memory management unit for controlling the data mover.

The method comprises the step of registering accessible memory chosen from the second portion of the memory with the emulated input output memory management unit. The method further comprises the step of writing address of the accessible memory to the address exchange module using the second address exchange module driver. The method further comprises the step of reading address handles of the accessible memory from the address exchange module using the first address exchange module driver. The method further comprises the step of determining if a write address of a request to write the data to the second memory portion is within the accessible memory using the emulated input output memory management unit. The method further comprises the step of moving the data into the second memory portion using the data mover if the write address is within the accessible memory. Advantages of this embodiment have been previously discussed.

Referring now to the figures, where like-numbered elements are either similar elements or perform an equivalent function. Elements which have been discussed previously will not necessarily be discussed in later figures if the function is equivalent.

Figure 1:
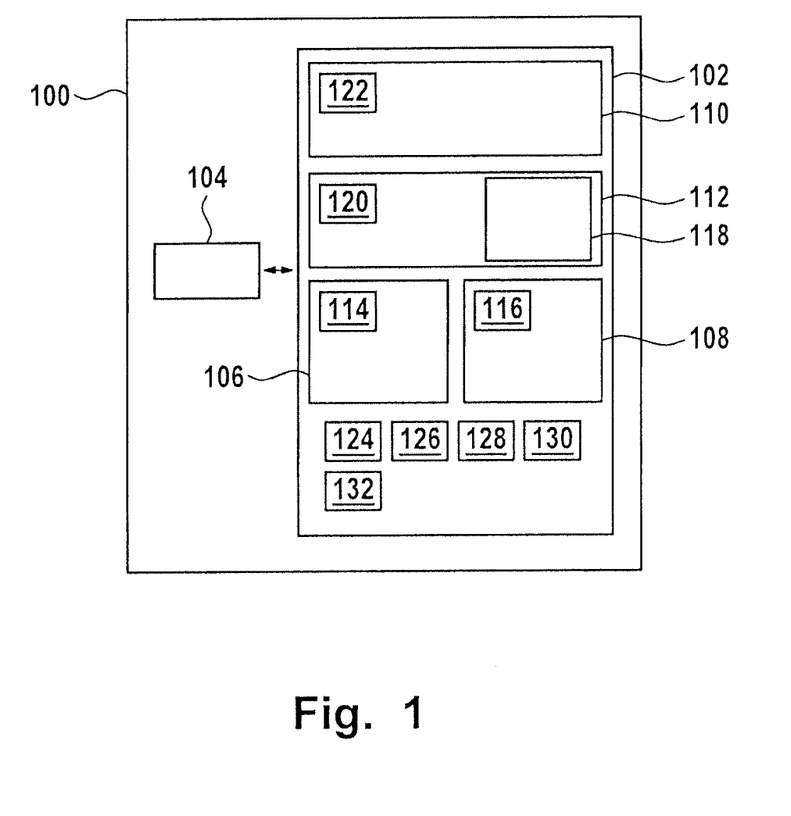
FIG. 1 illustrates a computer system according to one or more aspects of the present invention.

FIG. 1 illustrates a computer system 100 according to an embodiment of the invention. The computer system 100 comprises a memory 102 and a processor 104. The memory 102 may comprise multiple memories. It may be memory directly accessible to a processor 104 or it may also be memory contained on another storage device such as a hard drive. For instance part of the memory allocated to a virtual or guest operating system may be contained in swap memory on a hard drive. The memory 102 contains a first guest operating system emulation 106 and a second guest operating system emulation 108. The first guest operating system 106 may also be referred to herein as OS1. The second guest operating system may also be referred to herein as OS2.

Embodiments of the invention are also applicable and there are more instances of guest operating systems. The invention may be scaled to any number of guest operating systems. The memory 102 has first portion of memory 110 which is allocated to the first guest operating system emulation 106 and a second portion memory 112 which is allocated to the second guest operating system emulation 108. The first guest operating system emulation 106 had a first address exchange module driver 114. The second guest operating system emulation 108 has a second address exchange module driver 116. It can be seen in the figure that the second portion of memory 112 has an accessible memory 118. The accessible memory 118 is a portion of the second portion of memory 112 which the second guest operating system 108 grants read and/or write access to the first guest operating system 106. The second portion of memory 112 is further shown as containing address handles 120 to the accessible memory 118. The address handles 120 contain handles which reference the location of the accessible memory 118. The first portion of memory 110 contains data 122. The address handles 120 can be transferred or copied from the first guest operating system emulation 106 to the second guest operating system emulation 108 using an address exchange module 124. The computer memory 102 is shown as containing an address exchange module 124 that is used to exchange address handles 120 using the first address exchange module driver 114 in conjunction with the second address exchange module driver 116.

The computer memory 102 is further shown as containing an emulated input output memory management unit 128 and a data mover 126. The second guest operating system 108 registers the address handles 120 with the emulated input output memory management unit 128. When the first guest operating system 106 makes a request to copy the data 122 into the accessible memory 118 the emulated input output memory management unit 128 first checks if these address handles are correct and will grant permission to move the data into the accessible memory 118. If that is the case then the emulated input output memory management unit 128 translates the address handles 120 to physical memory addresses 130. The physical memory addresses 130 are shown as being stored in the computer memory 102. The data mover 126 then uses the physical memory addresses 130 to copy the data 122 directly into the accessible memory 118.

The memory 102 is also shown as containing the operating system 132 of the computer system 100. The operating system 132 contains machine executable instructions that enable the processor to operate the computer system 100 including the management of the first guest operating system 106 and the second guest operating system 108.

Figure 2:
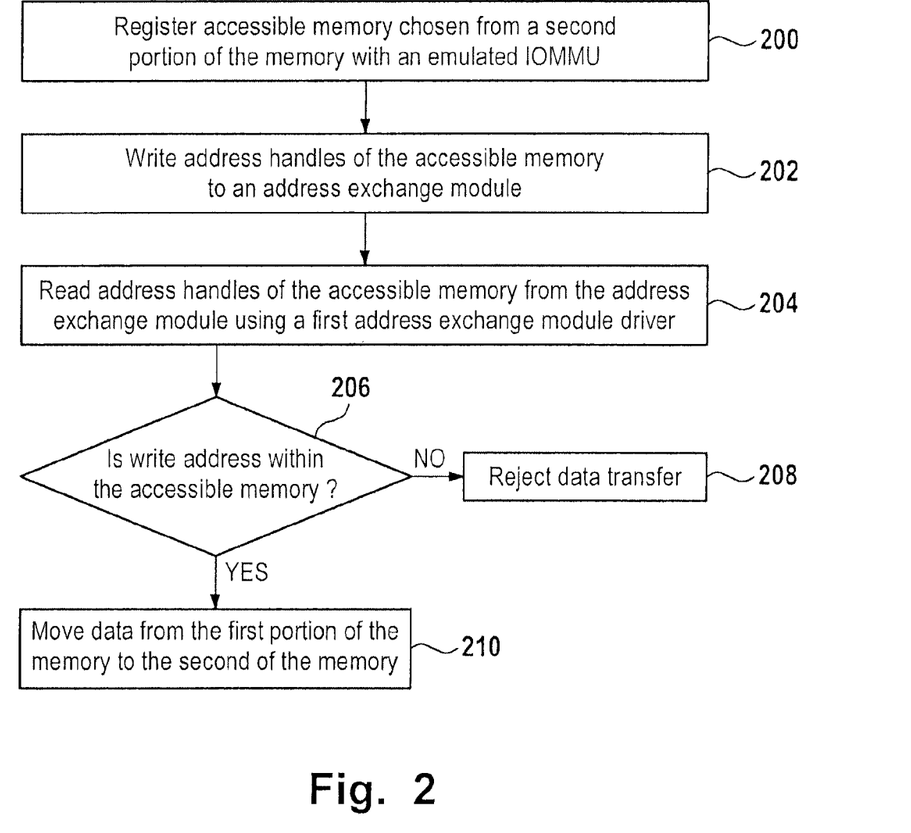
FIG. 2 shows a flow diagram which illustrates a method according to one or more aspects of the present invention.

FIG. 2 shows a flow diagram which illustrates a method according to an embodiment of the invention. In step 200 the accessible memory chosen from a second portion of the memory is registered with an emulated input output memory management unit. Next in step 202 address handles of the accessible memory are written to an address exchange module. Next in step 204 address handles of the accessible memory are read from the address exchange module using a first address exchange module driver. In some embodiments a second address exchange module driver was used to write the address handles of the accessible memory to the address exchange module. Next step 206 is a decision box in step 206 it is determined if the address is within the accessible memory. This for instance may be performed by the emulated input output memory management unit. If the address is not within the accessible memory then the transfer is rejected 208. If however the write address is within the accessible memory then data is moved from the first portion of the memory to the second portion of the memory. This for instance may be performed by a data mover.

Figure 3:
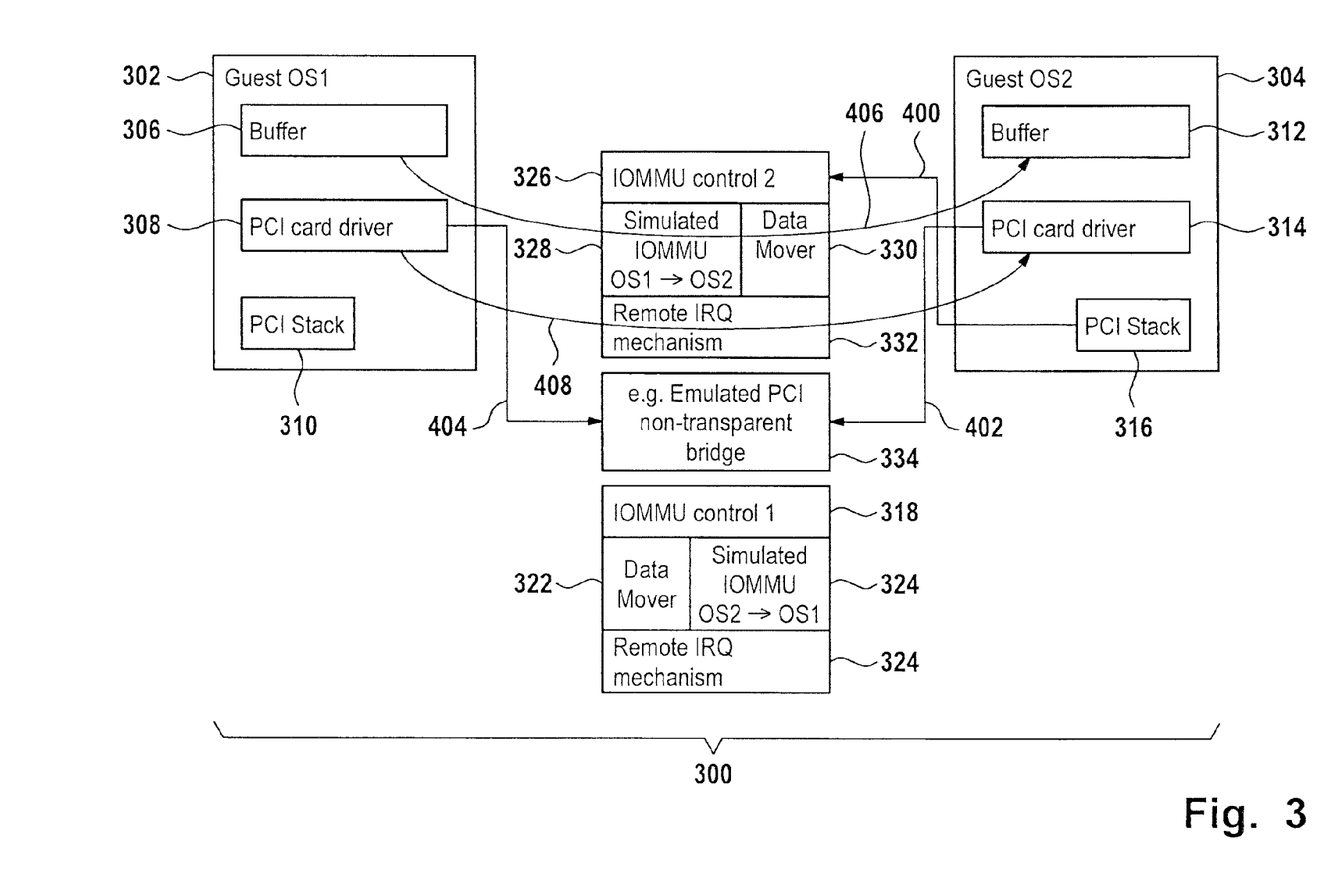
FIG. 3 illustrates another computer system according to one or more aspects of the present invention.

FIG. 3 functionally illustrates a computer system 300 according to an embodiment of the invention. In FIG. 3, the processor and the physical memory are not shown. Computer system 300 comprises a first guest operating system 302 and a second guest operating system 304. The first guest operating system 302 comprises a buffer 306, a PCI card driver 308, and a PCI stack 310. The second guest operating system 304 comprises a buffer 312, a PCI card driver 314, and a PCI stack 316. The computer system 300 further comprises a first input output memory management unit control 318. The first input output memory management unit control is adapted for controlling a simulated input output memory management unit 320. The simulated input output memory management unit 320 is adapted for moving data from the second operating system to the first guest operating system. The simulated input output memory management unit 320 uses data mover 322 to perform this. The computer system 300 further comprises a remote IRQ mechanism 324 which is used for sending a message from operating system two to guest operating system one 302 when the second guest operating system 302 has written data into the buffer 306 of the first guest operating system 302. The computer system 300 further comprises a second IO memory management unit control 326. The second IO memory management control 326 is adapted for controlling a second simulated input output memory management unit 328. The second input output memory management unit 328 is adapted for copying data from the buffer 306 of guest operating system one 302 to the buffer 312 of guest operating system 304. The simulated input output memory management unit 328 uses data mover 330 to accomplish this. The computer system 300 further comprises a second remote IRQ mechanism 332 which is adapted for sending a signal when the first guest operating system one has completed copying data from the buffer 306 to the buffer 312 of guest operating system two 304. The computer system 300 further comprises an emulated PCI non-transparent bridge. The emulated PCI non-transparent bridge 334 may be replaced with other means of data exchange in other embodiments.

The arrows labeled 400, 402, 404, 406, and 408 illustrate actions performed by the computer system 300. These arrows correspond to a flow chart shown in FIG. 4.

Figure 4:
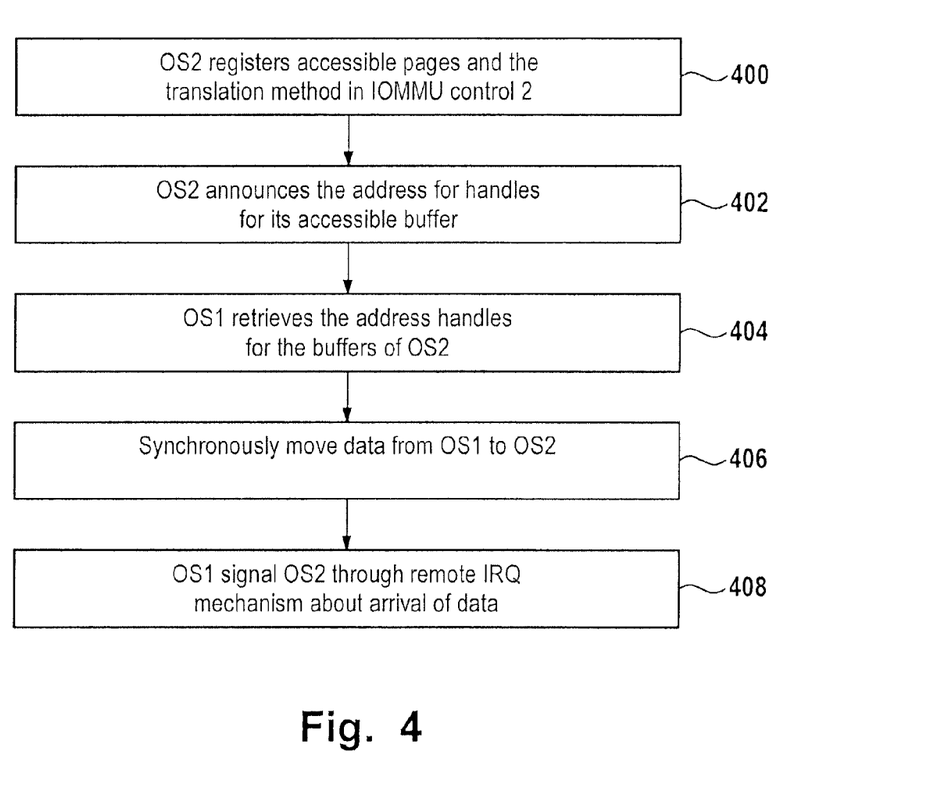
FIG. 4 allows a flow diagram which illustrates another method according to one or more aspects of the present invention.

FIG. 4 shows a flow chart which illustrates a further embodiment of the invention. In the first step 400 the second guest operating system 304 registers accessible pages or memory and the translation method or address handles in input output memory management unit control number two 326. Next in step 402 the second guest operating system announces the address handles for its accessible buffer. This may for example be accomplished using the non-transparent bridge 334. Next in step 404 the first guest operating system uses its PCI card driver 308 to read the address handles for the second operating system's buffer 312.

Next in step 406 data is synchronously moved from the buffer 306 of the first guest operating system 302 to the buffer 312 of the second guest operating system 304. This may for instance be accomplished by the first guest operating system 302 invoking the data mover 330. The simulated IO memory measurement unit 328 translates the address handles into physical addresses for the buffer. The simulated IO memory management unit may reject accesses outside the registered buffer space. This is equivalent to the decision box 206 in FIG. 2. Finally in step 408 the first guest operating system 302 uses PCI card driver 308 to use the remote IRQ mechanism 332 to signal the PCI card driver 314 of the second guest operating system 304 that data has been transferred to the buffer 312. This may for instance be accomplished using a remote Message Signaled Interrupt (MSI) or MSI-X IRQ mechanism.

| List of Reference Numerals | |
| --- | --- |
| 100 | computer system |
| 102 | memory |
| 104 | processor |
| 106 | first guest operating system emulation |
| 108 | second guest operating system emulation |
| 110 | first portion of memory |
| 112 | second portion of memory |
| 114 | first address exchange module driver |
| 116 | second address exchange module driver |
| 118 | accessible memory |
| 120 | address handles |
| 122 | data |
| 124 | address exchange module |
| 126 | data mover |
| 128 | emulated input output memory management unit |
| 130 | physical memory addresses |
| 132 | operating system |
| 300 | computer system |
| 302 | first guest operating system |

-continued

| List of Reference Numerals | |
| --- | --- |
| 304 | second guest operating system |
| 306 | buffer |
| 308 | PCI card driver |
| 310 | PCI stack |
| 312 | buffer |
| 314 | PCI card driver |
| 316 | buffer |
| 318 | IOMMU control 1 |
| 320 | simulated IOMMU |
| 322 | data mover |
| 324 | remote IRQ mechanism |
| 326 | IOMMU control 2 |
| 328 | simulated IOMMU |
| 330 | data mover |
| 332 | remote IRQ mechanism |
| 334 | Emulated PCI non-transparent bridge |

What is claimed is:

1. A computer system, comprising:
a processor; and
a memory containing machine executable instructions for execution by the processor, wherein the memory comprises:
a first guest operating system comprising a first portion of the memory;
a second guest operating system comprising a second portion of the memory;
an address exchange module for exchanging memory address handles between the first guest operating system and the second guest operating system, wherein the first guest operating system comprises a first address exchange module driver for exchanging the memory address handles using the address exchange module, wherein the second guest operating system comprises a second address exchange module driver for exchanging the memory address handles using the address exchange module;
a data mover for moving data between the first portion of the memory and the second portion of the memory;
an emulated input output memory management unit for controlling the data mover; and
wherein execution of the instructions causes the processor to:
register accessible memory chosen from the second portion of the memory with the emulated input output memory management unit;
write address handles of the accessible memory to the address exchange module using the second address exchange module driver;
read the address handles from the address exchange module using the first address exchange module driver;
determine if a write address of a request to write the data to the second memory portion is within the accessible memory using the emulated input output memory management unit; and
move the data into the second portion of the memory using the data mover if the write address is within the accessible memory.

2. The computer system of claim 1, wherein the data mover asynchronously moves the data between the first portion of the memory and the second portion of the memory.

3. The computer system of claim 1, wherein execution of the instructions further causes the processor to signal data arrival to the second guest operating system after the data is written into the second memory portion.

4. The computer system of claim 3, wherein the computer system further comprises an IRQ mechanism, and wherein execution of the instructions further cause the processor to signal the data arrival using the IRQ mechanism.

5. The computer system of claim 1, wherein the address exchange module is an Emulated PCI non-transparent bridge.

6. The computer system of claim 5, wherein the first address exchange module driver is a first virtual PCI card driver, wherein the second address exchange module driver is a second virtual PCI card driver, wherein the second guest operating system comprises a PCI stack, wherein execution of the instructions further cause the processor to uses the PCI stack to register accessible memory chosen from the second portion of the memory with the emulated input output memory management unit.

7. The computer system of claim 1, wherein the address exchange module is any one of the following: an emulated PCI transparent bridge, a physical network connection, a virtual network connection, a database, or a file.

8. The computer system of claim 1, wherein the emulated input output memory management unit is adapted for translating the address handles into physical memory addresses, wherein execution of the instructions further causes the processor to translate the address handles into the physical addresses using the emulated input output memory management unit, and where the data mover uses the physical memory addresses to write the data in the second memory.

9. The computer system of claim 1, wherein the first memory portion is a first buffer of the first guest operating system, wherein the second portion of the memory is a second buffer of the second guest operating system.

10. The computer system of claim 1, wherein the accessible memory is a section of the second portion of the memory for which the second guest operating system grants writing and/or reading permission to the first guest operating system.

11. The computer system of claim 1, wherein execution of the instructions further cause the processor to reject writing and/or reading the data in the second memory portion using the data mover using the data mover if the write address is within the accessible memory.

12. A computer-readable storage medium containing machine executable instructions for execution by a processor of a computer system, wherein the computer-readable storage medium comprises:
a first guest operating system comprising a first portion of the memory;
a second guest operating system comprising a second portion of the memory;
an address exchange module for exchanging memory address handles between the first guest operating system and the second guest operating system, wherein the first guest operating system comprises a first address exchange module driver for exchanging the memory address handles using the address exchange module, wherein the second guest operating system comprises a second address exchange module driver for exchanging the memory address handles using the address exchange module;
a data mover for moving data between the first portion of the memory and the second portion of the memory;
an emulated input output memory management unit for controlling the data mover; and
wherein execution of the instructions causes the processor to:
register accessible memory chosen from the second portion of the memory with the emulated input output memory management unit;
write address handles of the accessible memory to the address exchange module using the second address exchange module driver;
read address handles of the accessible memory from the address exchange module using the first address exchange module driver;
determine if a write address of a request to write the data to the second memory portion is within the accessible memory using the emulated input output memory management unit; and
move the data into the second memory portion using the data mover if the write address is within the accessible memory.

13. The computer-readable storage medium of claim 12, wherein the data mover asynchronously moves the data between the first portion of the memory and the second portion of the memory.

14. The computer-readable storage medium of claim 12, wherein execution of the instructions further causes the processor to signal data arrival to the second guest operating system after the data is written into the second memory portion.

15. A computer-implemented method of operating a computer system, wherein the computer system comprises a processor, wherein the computer system further comprises a memory containing machine executable instructions for execution by the processor, wherein the memory comprises:
a first guest operating system comprising a first portion of the memory;
a second guest operating system comprising a second portion of the memory;
an address exchange module for exchanging memory address handles between the first guest operating system and the second guest operating system, wherein the first guest operating system comprises a first address exchange module driver for exchanging the memory address handles using the address exchange module, wherein the second guest operating system comprises a second address exchange module driver for exchanging the memory address handles using the address exchange module;
a data mover for moving data between the first portion of the memory and the second portion of the memory;
an emulated input output memory management unit for controlling the data mover; and
wherein the method comprises:
registering accessible memory chosen from the second portion of the memory with the emulated input output memory management unit;
writing address handles of the accessible memory to the address exchange module using the second address exchange module driver;
reading address handles of the accessible memory from the address exchange module using the first address exchange module driver;
determining if a write address of a request to write the data to the second memory portion is within the accessible memory using the emulated input output memory management unit; and
moving the data into the second portion of the memory using the data mover if the write address is within the accessible memory.

16. The computer-implemented method of claim 15, wherein the data mover asynchronously moves the data between the first portion of the memory and the second portion of the memory.

17. The computer-implemented method of claim 15, wherein execution of the instructions further causes the processor to signal data arrival to the second guest operating system after the data is written into the second memory portion.

18. The computer-implemented method of claim 17, wherein the computer system further comprises an IRQ mechanism, and wherein execution of the instructions further cause the processor to signal the data arrival using the IRQ mechanism.

19. The computer-implemented method of claim 15, wherein the address exchange module is an Emulated PCI non-transparent bridge.

20. The computer-implemented method of claim 19, wherein the first address exchange module driver is a first virtual PCI card driver, wherein the second address exchange module driver is a second virtual PCI card driver, wherein the second guest operating system comprises a PCI stack, wherein execution of the instructions further cause the processor to use the PCI stack to register accessible memory chosen from the second portion of the memory with the emulated input output memory management unit.

\* \* \* \* \*